D. K. INNES & W. W. MAGILL.

Improvement in Mantles and Fronts for Fire Places.

No. 4,612. Reissued Oct. 31, 1871.

D. K. Innes & W. W. Magill
INVENTORS.
By Knight Bros.
Attys.

Attest.
Jas. H. Layman.
C. Williamson

AM. PHOTO-LITHOGRAPHIC N.Y. (OSBORNE'S PROCESS.)

UNITED STATES PATENT OFFICE.

DAVID K. INNES AND WESLEY W. MAGILL, OF CINCINNATI, OHIO.

IMPROVEMENT IN MANTELS AND FRONTS FOR FIRE-PLACES.

Specification forming part of Letters Patent No. 117,294, dated July 25, 1871; reissue No. 4,612, dated October 31, 1871.

DIVISION A.

*To all whom it may concern:*

Be it known that we, DAVID K. INNES and WESLEY W. MAGILL, both of Cincinnati, Hamilton county, Ohio, have invented certain Improvements in Mantels and Fronts for Fire-Places, of which the following is a specification:

Our invention relates to a construction of fire-place mantel partly of metallic and partly of non-metallic materials; and the first part of said invention consists in providing a mantel or fire-place front wholly or chiefly of cast-iron, with a shelf or mantel proper composed of slate, marble, or other suitable mineral, by which arrangement we secure, in conjunction with a comparatively cheap front, a perfectly flat and uniformly smooth shelf of such thickness as to meet the requirements of taste without excessive weight. The second part of our invention consists in providing such a mantel with slate, marble, or other mineral wall-plates, which can be adjusted so as to allow the mantel to fit any width of chimney-wall. By thus combining a metallic with a non-metallic material we are enabled to manufacture a more perfect and saleable mantel than could be produced with either material alone, and at a cheaper rate.

Figure 1:
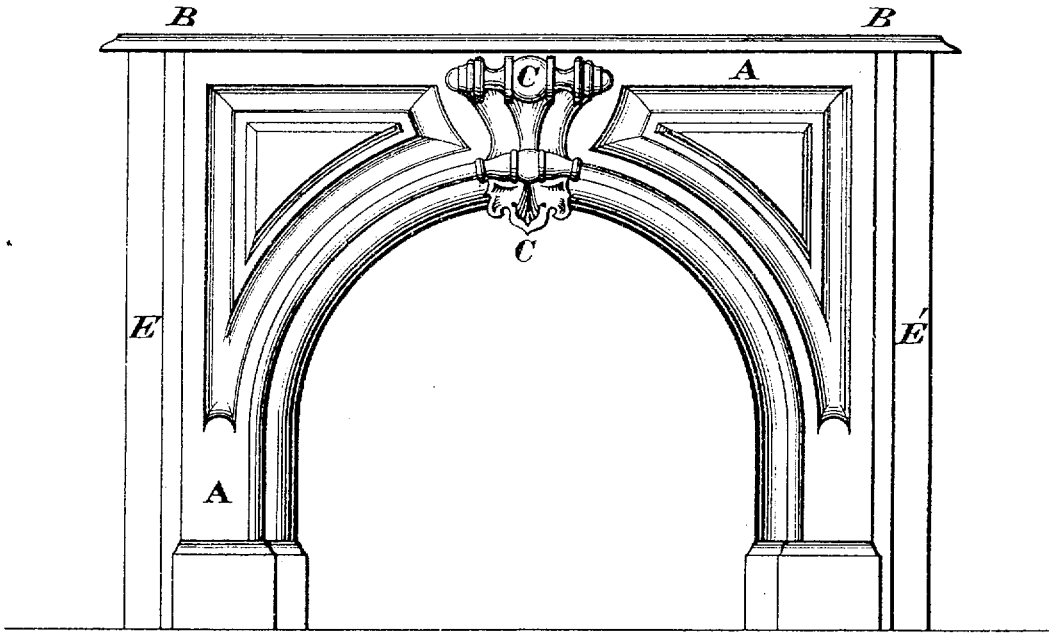
Figure 2:
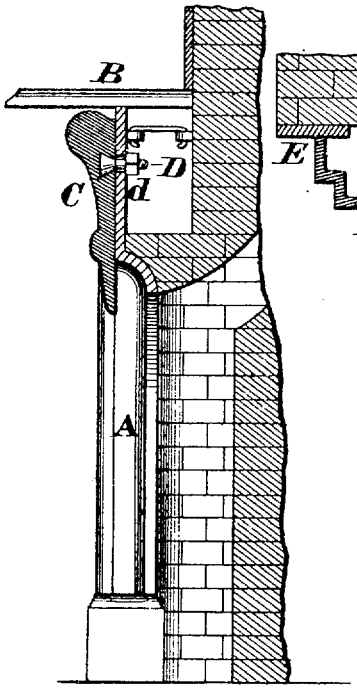
Figure 3:
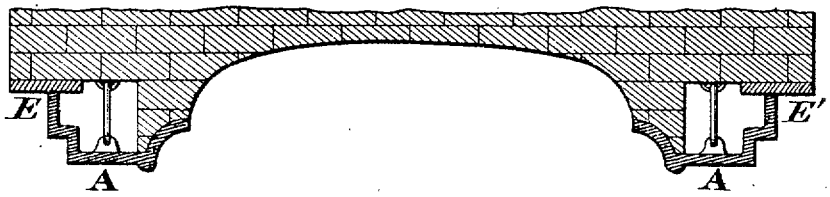
Figure 4:
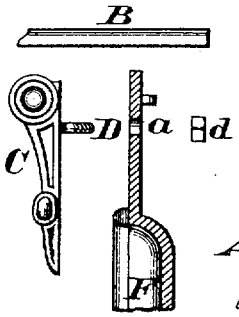

Figure 1 is a front elevation of a mantel embodying our improvements. Fig. 2 is a vertical section of the same. Fig. 3 is a horizontal section, showing the shiftable wall-plates; and Fig. 4 is a section through the upper part of the mantel, with the shelf and key shown in elevation and detached.

A represents a cast-iron mantel-plate, which is secured to the chimney-wall in any suitable manner, and is surmounted by a shelf, B, which, instead of being like the front plate, of cast-iron, is composed of slate, marble, or other mineral. This shelf rests upon the front plate, and is fitted into the chimney-wall in the usual manner. The key C, with its manner of attachment, being the subject of a separate division of this reissue, needs no specific description. The wall-plates E E′, instead of being cast in one piece with the front plate, are slabs of slate, marble, or other mineral. The great objection to cast-iron mantel-shelves has always been that in cooling they will warp to a greater or less extent, and no amount of care or attention on the part of the molder will assure a plate sightly enough to occupy so conspicuous a place as the mantel-shelf. The provision of the mineral shelf entirely overcomes this objection, and causes the mantel to present a perfectly finished, substantial, and symmetrical appearance. The mineral shelf can be marbleized or otherwise ornamented, so as to agree with the front or mantel-plate, which, being always constructed with a number of angles, moldings, ornaments, &c., is thereby stiffened, and will not, although of metal, warp or twist like the comparatively-flat mantel-shelf, whose exposed edge in the plane of vision exhibits too conspicuously any slight departure from regularity. Iron mantels as heretofore constructed have had their wall-plates cast with them, which is a great disadvantage, because they seldom agree precisely with the breadth of the chimney-wall; but by making said plates separable they can be shifted so as to exactly fit the place where the mantel is to be secured. These plates may be of slate, marble, stone, or other mineral, and may be held in position by the front plate A, as represented in Fig. 3.

We claim as our invention—

1. Providing a cast-iron mantel with a shelf composed of slate, marble, or other suitable mineral, as and for the purpose explained.

2. The detached and shiftable wall-plates E E′, when arranged as herein described, and for the object designated.

In testimony of which invention we hereunto set our hands before two subscribing witnesses.

DAVID K. INNES.
WESLEY W. MAGILL.

Witnesses:
GEO. H. KNIGHT,
JAMES H. LAYMAN.